3,423,182
Patented Jan. 21, 1969

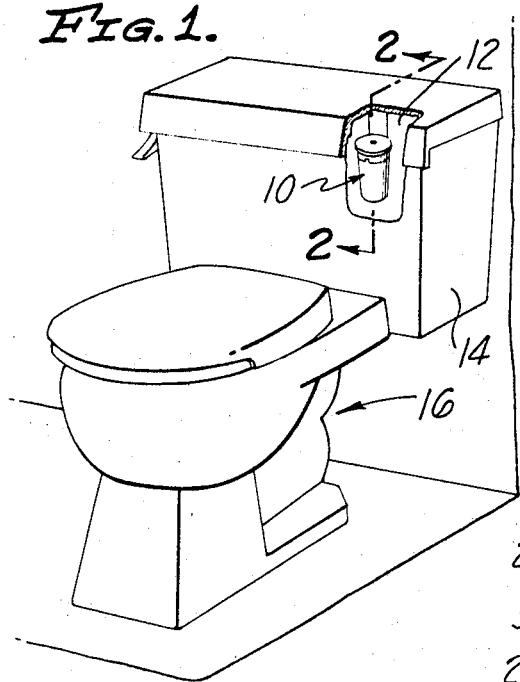
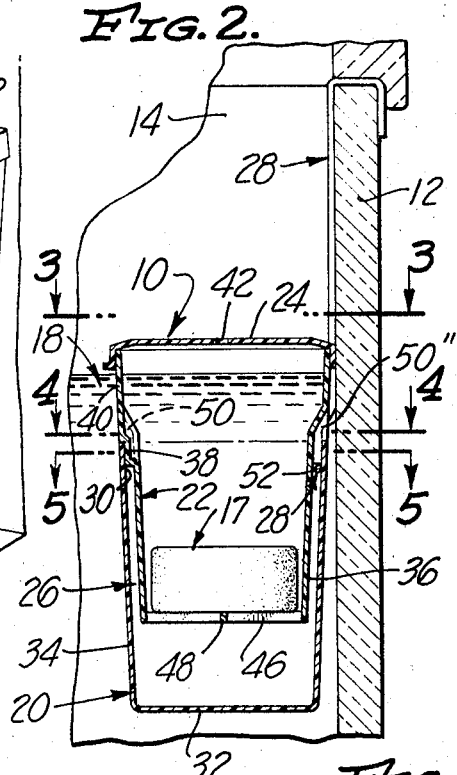
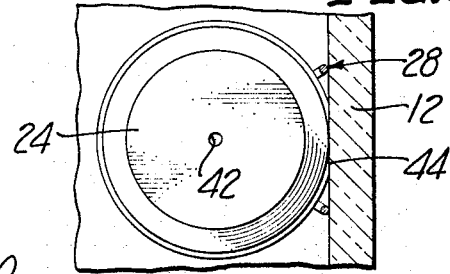
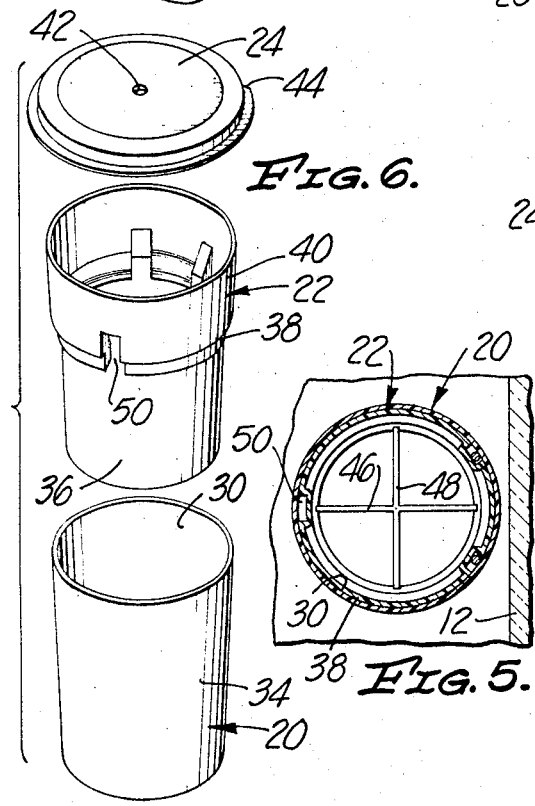
INVENTOR
MORRIS B. KLASKY
BY HIS ATTORNEYS
HARRIS, KIECH, RUSSELL & KERN _United States Patent Office_

3,423,182
WATER-TREATING APPARATUS
Morris B. Klasky, 1420 S. Rexford Drive,
Los Angeles, Calif. 90035
Filed Apr. 3, 1967, Ser. No. 628,010
U.S. Cl. 23—267          2 Claims
Int. Cl. B01d *11/00;* E04h *3/20*

ABSTRACT OF THE DISCLOSURE

A container storing a quantity of water-treating material in a bottom portion thereof and adapted for partial submerging in a body of water of changing level. A water passageway extends from the bottom portion of the container upwardly to the outside of the container above the bottom portion. When the body of water is at a normal level, the upper end of the passageway is submerged and the container is filled by water flowing downwardly through the passageway into the bottom portion and then rising into a top portion of the container. As the level of the body of water drops below the upper end of the passageway, a predetermined amount of a concentrated mixture of water and treating material flows from the bottom portion of the container upwardly through the passageway and from the container to treat the body of water.

---

The present invention relates to water-treating apparatus and, more particularly, to apparatus for introducing controlled amounts of water-treating material into a body of water of changing level.

Bodies of water characterized by rising and falling levels are found in numerous industrial, commercial, and household water systems and devices. Possibly, one of the most common of such devices is the flush tank of a toilet wherein water falls from and returns to a normal level upon each flushing of the toilet.

In the past, various apparatus have been employed to treat such bodies of water, as by disinfecting, deodorizing, coloring, and the like. One of the most common of such devices and one often employed in a toilet flush tank comprises a cannister having a side hole into a top portion thereof and an air vent to atmosphere. The cannister is adapted to receive and store a water dissoluble cake of disinfectant, deodorant, or coloring material, and is designed for connection to a side of a toilet flush tank such that the side port is just below the normal level of the water.

Thus arranged, and when the water in the flush tank is at its normal level, water flows into the canister through the side port filling the cannister to substantially the normal level. Then, as the level of the water in the flush tank drops below the side port, water in the cannister and above the side port flows therethrough to carry water-treating material into the flush tank water. The same water-treating process is repeated upon each rise and fall of the level of water in the flush tank.

Unfortunately, such conventional water-treating apparatus is inefficient in operation and rather ineffective in disinfecting, deodorizing, and coloring water.

In particular, in such water-treating apparatus, the cake of water-treating material rests on the bottom of the cannister and dissolves slowly to form a concentrated mixture of water-treating material and water. However, since water only enters and exits through the side port, there is only surface mixing of water in the cannister and little or no circulation of water to and from the bottom of the cannister. Therefore, substantially all of the concentrated mixture settles and remains in the bottom portion of the cannister and soon forms a thick sludge on the bottom and side walls of the cannister. A sludge also forms on and covers the cake of water-treating material materially slowing if not completely halting its rate of disintegration and entry into the water in the cannister. Since only small amounts of the water-treating material migrate to the top surface of the water in the cannister, only small quantities of water-treating material are dispensed from the cannister during each cycle of operation. Accordingly, it is appreciated that the conventional form of such water-treating apparatus is inefficient in its mixing operation and rather ineffective in the treating of its associated body of water.

In view of the foregoing shortcomings of conventional forms of apparatus for treating bodies of water characterized by rising and falling levels, it is an object of the present invention to provide a simple and inexpensive water-treating apparatus which is highly effective in mixing water with water-treating material for selective dispensing to an associated body of water of rising and falling level.

Another object of the present invention is to provide a water-treating apparatus of the foregoing character including means for directing the inward and outward flow of water therein downward to and around a quantity of water-treating material to insure a maximum mixing of the water-treating material with the water dispensed from the apparatus and to prevent the build-up of sludge which might otherwise impair the efficient operation and require periodic cleaning of the apparatus.

A further object of the present invention is to provide a water-treating apparatus including a hollow container for partial submersion in a body of water of varying level and including a water passageway extending from a bottom portion of the container upwardly to the outside of the container above the bottom portion but at a point below the normal level of the body of water, whereby the container is filled by water flowing downwardly through the passageway into the bottom portion, there mixing with a quantity of water-treating material, and then rising into a top portion of the container, and whereby as the level of the body of water drops below the upper end of the passageway a predetermined amount of concentrated mixture of water and water-treating material flows from the bottom portion of the container upwardly through the passageway and into the body of water.

The foregoing as well as other objects and advantages of the present invention may be more clearly understood be reference to the folowing detailed description when considered with the drawing which, by way of example only, illustrates one form of water-treating apparatus including the features of the present invention.

In the drawing:

FIG. 1 is a perspective view of a conventional household toilet with a portion of the flush tank broken away to expose the water-treating apparatus mounted therein;

FIG. 2 is a sectional side view taken along the line 2—2 of FIG. 1, illustrating the inner construction of the water-treating apparatus;

FIG. 3 is a top view of the water-treating apparatus taken along the line 3—3 of FIG. 2;

FIG. 4 is a cross-sectional top view of the water-treating apparatus taken along the line 4—4 of FIG. 3;

FIG. 5 is a cross-sectional top view taken along the line 5—5 of FIG. 2; and

FIG. 6 is a perspective view of the component parts of the water-treating apparatus separated from each other for clarity.

In the drawing, the water-treating apparatus is represented by the numeral 10 and in FIG. 1 is connected to a back wall 12 in the flush tank 14 of a conventional toilet 16.

Generally speaking, the water-treating apparatus 10 is adapted to store a quantity of water-treating material 17 and to dispense controlled amounts of a concentrated mixture of treating material and water to the body of water 18 within the flush tank upon each fall and rise of the level of the water and to do so in a highly efficient and effective manner to treat the water as by disinfecting, deodorizing, or coloring.

To accomplish the foregoing, and again speaking in general terms, the water-treating apparatus 10 comprises a cylindrical cup 20 and a tubular member 22 closed at its upper end by a cap 24. Within the apparatus, the cup 20 and tubular member 22 are designed to define a water passageway 26 between a bottom portion of the cup and the outside of the tubular member above the cup. The cup and tubular member are also designed for connection by means 28 to the back wall 12 of the flush tank 14 such that when the body of water 18 is at its normal level, the upper end of the passageway 26 is submerged.

Therefore, with the apparatus thus arranged and the water 18 at its normal level, the cup 20 and tubular member 22 are filled by water flowing downwardly through the passageway 26 into the bottom portion of the cup and then upwardly into the tubular member. As the water flows downwardly into the cup 20, it flows around and in direct contact with the water-treating material 17, which is preferably a water-dissoluble cake of a water-soluble disinfectant, deodorant, or coloring material, mixes thoroughly therewith and then rises into the tubular member 22. Accordingly, all water in the water-treating apparatus 10 is highly concentrated with the treating material.

Then, as the level of the water 18 drops below the upper end of the passageway, as upon a flushing of the toilet 16, gravitational forces acting on the water in the tubular member 22 cause a highly concentrated mixture of water and water-treating material to flow upwardly from the bottom portion of the cup 20 through the passageway 26 and into the body of water 18 to treat the water. The flow of concentrated mixture from the apparatus 10 continues until the water in the tubular member 22 drops to a level where the upward forces on the water in the passageway 26 caused by the gravitational forces on the water in the tubular member substantially equal the weight of the water in the passageway. Accordingly, a predetermined quantity of mixture is dispensed from the apparatus upon each cycle of operation.

Since the water flowing in and out of the passageway 26 comes into direct contact with the cake of water-treating material 17 and flows upwardly into the tubular member 22, the mixing operation within the water-treating apparatus 10 is extremely efficient and the concentration of the water-treating material in solution is maximized and substantially uniform throughout the apparatus 10. Also, since water flowing in and out of the passageway 26 passes over and in contact with the cake 17, there is a minimum of sludge developed within the apparatus and on the surface of the cake which might otherwise reduce the rate at which the cake dissolves and require frequent cleaning of the apparatus.

More specifically, and as most clearly represented in FIGS. 2 and 6, the cylindrical cup 20 includes an open top 30, a closed bottom 32, and side walls 34 extending vertically from the bottom.

The tubular member 22 includes a cylindrical lower portion 36 adapted to fit within the cup 20 in spaced relation to the side walls 34. An annular intermediate portion 38 of the tubular member 22 is connected to and extends laterally from the top of the lower portion 36 and is dimensioned to fit tightly into the open top 30 of the cup 20, the outer surface of the intermediate portion being in tight contact with the inner surface of the cup around the open top. In addition to the lower and intermediate portions, the tubular member 22 includes a cylindrical top portion 40 connected to and extending vertically from the top of the intermediate portion in line with the side walls 34 of the cup 20.

The open top of the tubular member 22 is closed by the cap 24 which includes a centrally located air vent 42 permitting air to flow into and from the water-treating apparatus 10 as water enters and exits therefrom through the passageway 26. The cap 24 also includes a flat side 44 which allows the apparatus 10 to be firmly mounted flush with the back wall 12 of the tank 14.

Various means may be employed to support the water-treating material 17 within the apparatus 10. For example, the water-treating material 17 may be supported on the closed bottom 32 of the cup 20. Alternatively, and as illustrated most clearly in FIGS. 2 and 5, the water-treating material 17 may be supported upon cross-arms 46 and 48 extending across and connected to the lower end of the tubular member 22. The water-treating material then rests on top of the cross-arms to expose all surfaces thereof to the water flowing into and from the passageway 26 and the tubular member 22. This arrangement permits maximum exposure of the water-treating material to the water in the apparatus 10 and minimizes the development of sludge in the bottom portion of the cup 20 during operation of the apparatus.

The passageway 26 comprises an important feature of the water-treating apparatus and as previously described, extends from the bottom portion of the cup 20, in the area of the water-treating material 17, to an outside of the apparatus above the bottom portion. Thus, although the passageway 26 may take various forms, it functions in one direction to guide water from the body of water 18 downwardly to and in contact with the water-treating material 17 and then upwardly into the apparatus 10. As the water level of the body of water drops, the passageway 26 functions in a reverse direction to guide water from the top of the apparatus downwardly around the material 17 and then upwardly and out of the apparatus into the body of water 18.

In the illustrated form of the invention, the passageway 26 comprises a vertically extending open ended channel 50 on the outside of the intermediate and upper portions 38 and 40 of a tubular member 22. The channel 50 is designed such that its upper end is open to an outside of the tubular member above the cup 20 and its lower end is open to an inside of the cup along the outside of the lower portion of the tubular member 22. Thus, arranged, the lower portion 36 of the tubular member 22 acts as a partition at the lower end of the channel 50 and combines therewith as part of the passageway 26 to insure that water passing through the channel 50 will first flow downwardly along the outside of the tubular member into the area of the treating material 17 and the bottom portion of the cup 20 before rising into the tubular member 22.

Additional channels, like 50, and represented by the numerals 50' and 50" may be included in water passageway 26 to assist in the flow of water into and out of the water-treating apparatus 10. The channels 50' and 50" are spaced circumferentially from each other and define an arcuate horizontally extending shoulder 52 therebetween. Thus arranged, the channels 50' and 50" in addition to providing water entries into and exits from the apparatus 10, may be employed to receive the means 28 for connecting the apparatus 10 to the flush tank 14.

In this regard, the means 28 may take various forms and it is by way of example only that it is illustrated as comprising a U-shaped piece of bent wire having hooked upper ends. Thus designed, the vertical arms of the means 28 extend downwardly through the channels 50' and 50" and a base of the U-shaped wire runs along and in contact with the under surface of the shoulder 52 to secure the means 28 to the apparatus 10. Then, by looping the hooked upper ends of the wire over the top of the back wall 12 the apparatus 10 may be mounted within the flush tank 14 with the upper end of the water passageway 26 slightly below the top surface of the body of water 18 when at its normal level.

It should be noted in passing that when channels 50' and 50" are included in the apparatus 10 and are designed to provide connection for the means 28, the channel 50 may be eliminated from the apparatus if desired.

From the foregoing, it is appreciated that the present invention provides an improved water-treating apparatus including means for efficiently mixing water with water-treating material and for dispensing controlled amounts of a concentrated mixture of treating material and water into the body of water upon each fall and rise in the level thereof.

While a particular form of water-treating apparatus has been described in some detail herein, changes and modifications may be made in the illustrated form without departing from the spirit of the invention. It is therefore intended that the present invention be limited in scope only by the terms of the following claims.

I claim:
1. A water-treating apparatus comprising:
   a cup having an open top, a closed bottom, and vertically extending side walls;
   a tubular member having a lower portion for fitting into said cup in laterally spaced relation to said side walls, and intermediate portion connected to the upper end of said lower portion and extending laterally outward and upwardly therefrom to tightly engage the upper inner surfaces of said side walls to securely connect said tubular member to said cup, and an upper portion of greater lateral dimension than and connected to the upper end of said intermediate portion and extending vertically therefrom above said cup, top cover means including air vent means circumferentially engaging the top end of the upper portion of said tubular member;
   a vertically extending open ended channel in the outside of said intermediate and upper portions having an upper end open to the outside of said tubular member above said cup and a lower end open to and inside of said cup along the outside of said lower portion;
   means on the bottom portion of said tubular member for supporting a quantity of water-treating material above the bottom of said cup; and
   means for mounting said cup in a body of water to be treated with said air vent above a top surface of said water and said upper end of said channel slightly below said top surface when at a normal level, the level of said body of water being variable between said normal level and a lower level below said upper end of said channel.

2. The apparatus of claim 1 including a second vertically extending open ended channel spaced circumferentially from said first mentioned channel and in the outside of said intermediate and upper portions having an upper end open to an outside of said tubular member above said cup and a lower end open to the inside of said cup along the outside of said lower portion whereby a horizontally extending shoulder is defined between said first mentioned and second channels; and
   wherein said means for mounting said cup includes U-shaped wire means having legs extending vertically through and from said first mentioned and second channels for connection at a side of said body of water and a base extending horizontally along and under said shoulder to support said cup.

References Cited

UNITED STATES PATENTS

| | | | |
|---|---|---|---|
| D. 191,106 | 8/1961 | Pannutti | 4—222 X |
| 1,213,978 | 1/1917 | Thornton | 4—227 |
| 3,107,156 | 10/1963 | Fredericks | 23—267 |
| 3,129,172 | 4/1964 | Dickey | 210—169 |
| 3,227,524 | 1/1966 | White | 23—267 |

FOREIGN PATENTS

| | | |
|---|---|---|
| 9,959 | 5/1893 | Great Britain. |
| 28,813 | 12/1904 | Great Britain. |
| 439,506 | 3/1935 | Great Britain. |

NORMAN YUDKOFF, *Primary Examiner.*

S. J. EMERY, *Assistant Examiner.*

U.S. Cl. X.R.

23—272.6, 272.8; 4—228; 222—424.5, 431; 210—160